US012641331B2

(12) United States Patent
Takeshita et al.

(10) Patent No.: US 12,641,331 B2
(45) Date of Patent: May 26, 2026

(54) VEHICULAR CAMERA

(71) Applicant: Panasonic Automotive Systems Co., Ltd, Kanagawa (JP)

(72) Inventors: Takao Takeshita, Tokyo (JP); Yingchun Guan, Kanagawa (JP); Yoshihiro Ueno, Osaka (JP); Shinkuro Fujino, Kyoto (JP); Masami Fukuhara, Kanagawa (JP)

(73) Assignee: Panasonic Automotive Systems Co., Ltd, Kanagawa (JP)

(*) Notice: Subject to any disclaimer, the term of this patent is extended or adjusted under 35 U.S.C. 154(b) by 69 days.

(21) Appl. No.: 18/643,704

(22) Filed: Apr. 23, 2024

(65) Prior Publication Data

US 2024/0276086 A1 Aug. 15, 2024

Related U.S. Application Data

(63) Continuation of application No. PCT/JP2022/025833, filed on Jun. 28, 2022.

(30) Foreign Application Priority Data

Nov. 5, 2021 (JP) ................................. 2021-181227

(51) Int. Cl.
*H04N 23/57* (2023.01)
*H04N 23/51* (2023.01)
*H04N 23/52* (2023.01)

(52) U.S. Cl.
CPC ............. *H04N 23/52* (2023.01); *H04N 23/51* (2023.01)

(58) Field of Classification Search
CPC ............................... H04N 23/52; H04N 23/51
See application file for complete search history.

(56) References Cited

U.S. PATENT DOCUMENTS

| | | | | |
|---|---|---|---|---|
| 10,841,465 B1* | 11/2020 | Dvorsky | ................ | H04N 23/55 |
| 2005/0285973 A1* | 12/2005 | Singh | ..................... | H04N 23/54 |
| | | | | 348/340 |

(Continued)

FOREIGN PATENT DOCUMENTS

| | | |
|---|---|---|
| JP | H06252578 A | 9/1994 |
| JP | H10256770 A | 9/1998 |

(Continued)

OTHER PUBLICATIONS

English Translation of International Search Report dated Sep. 20, 2022, for the corresponding International Patent Application No. PCT/JP2022/025833, 2 pages.

(Continued)

*Primary Examiner* — Patrick E Demosky
(74) *Attorney, Agent, or Firm* — Seed Intellectual Property Law Group LLP

(57) ABSTRACT

A vehicular camera according to an aspect of an embodiment includes a substrate, a housing, and a conductive member. An imaging element is mounted on the substrate on. The housing has a first housing and a second housing made of metal. The housing accommodates the substrate in a space formed by the first housing and the second housing. The conductive member is disposed at a joint portion between the first housing and the second housing, and has conductivity. Any one or both of the first housing and the second housing have an insulating layer on a surface thereof.

10 Claims, 4 Drawing Sheets

(56)                References Cited

U.S. PATENT DOCUMENTS

| | | | |
|---|---|---|---|
| 2010/0276001 A1 * | 11/2010 | Sawada ..................... | C22C 1/11 |
| | | | 428/653 |
| 2013/0063878 A1 * | 3/2013 | Kirihara ................. | H05K 5/061 |
| | | | 361/679.01 |
| 2021/0122299 A1 | 4/2021 | Garcia | |

FOREIGN PATENT DOCUMENTS

| | | | |
|---|---|---|---|
| JP | 2001124206 A | 5/2001 | |
| JP | 2011071362 A | 4/2011 | |
| JP | 2013058595 A | 3/2013 | |
| JP | 2021067950 A | 4/2021 | |

OTHER PUBLICATIONS

Notice of Reasons for Refusal, dated Dec. 23, 2025, for Japanese Patent Application No. 2023-557619. (5 pages)(with English Translation).

* cited by examiner

VEHICULAR CAMERA

CROSS-REFERENCE TO RELATED APPLICATIONS

This application is a continuation of International Application No. PCT/JP2022/025833, filed on Jun. 28, 2022 which claims the benefit of priority of the prior Japanese Patent Application No. 2021-181227, filed on Nov. 5, 2021, the entire contents of which are incorporated herein by reference.

FIELD

The present disclosure relates to a vehicular camera.

BACKGROUND

Conventionally, in an electronic device including a substrate, electromagnetic noise generated by the electronic device is shielded by covering the substrate with a metal housing (for example, JP H10-256770 A and JP H6-252578 A). The electromagnetic noise includes, for example, electromagnetic interference (EMI) in which the electronic device radiates unnecessary electromagnetic noise to the outside, and electromagnetic susceptibility (EMS) in which the electronic device operates without deteriorating performance due to various external factors (noise). The electronic device needs to be designed and manufactured so as to remove the above-described electromagnetic noise and maintain electromagnetic compatibility (EMC).

In recent years, with the spread of driving support systems for vehicles, vehicular cameras (imaging devices) are increasingly mounted on vehicles. In the vehicular camera, which is one of electronic devices, for example, from the viewpoint of miniaturization or the like, there is a configuration in which an optical unit and a substrate are arranged in an optical axis direction of imaging, and the substrate is covered with a housing. In such a configuration, for example, since housings divided in the vertical direction of the optical axis are combined, the housings are connected by a fixing member such as a screw.

In addition, in order to prevent water droplets from entering the housing, a non-conductive elastic body such as a rubber packing is provided in a gap between the housings.

However, in the above-described conventional configuration, there is a possibility that electromagnetic noise generated inside leaks and enters through the gap between the housings. In addition, there is a possibility that the electromagnetic noise generated inside causes resonance in the gap between the housings, and the electromagnetic noise leaks and enters the outside by causing the entire housing to resonate.

An object of the present disclosure is to provide a vehicular camera capable of reducing leakage and entry of electromagnetic noise.

SUMMARY

A vehicular camera according to an aspect of an embodiment includes a substrate, a housing, and a conductive member. An imaging element is mounted on the substrate on. The housing has a first housing and a second housing made of metal. The housing accommodates the substrate in a space formed by the first housing and the second housing. The conductive member is disposed at a joint portion between the first housing and the second housing, and has conductivity. Any one or both of the first housing and the second housing have an insulating layer on a surface thereof.

DETAILED DESCRIPTION

Hereinafter, an embodiment of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

An imaging device according to the present embodiment corresponds to a vehicular camera that is mounted on a vehicle and can be used for driving support of the vehicle. An imaging device for driving support detects an object such as a vehicle, a pedestrian, or an obstacle by image processing using an internal image signal processor (ISP), and plays a major role in a driving support system of a vehicle such as giving a warning to a driver or forcibly stopping the vehicle.

Note that the configuration of the imaging device may be applied to a camera attached to a moving body such as a drone, a security camera, or another camera.

Figure 1:
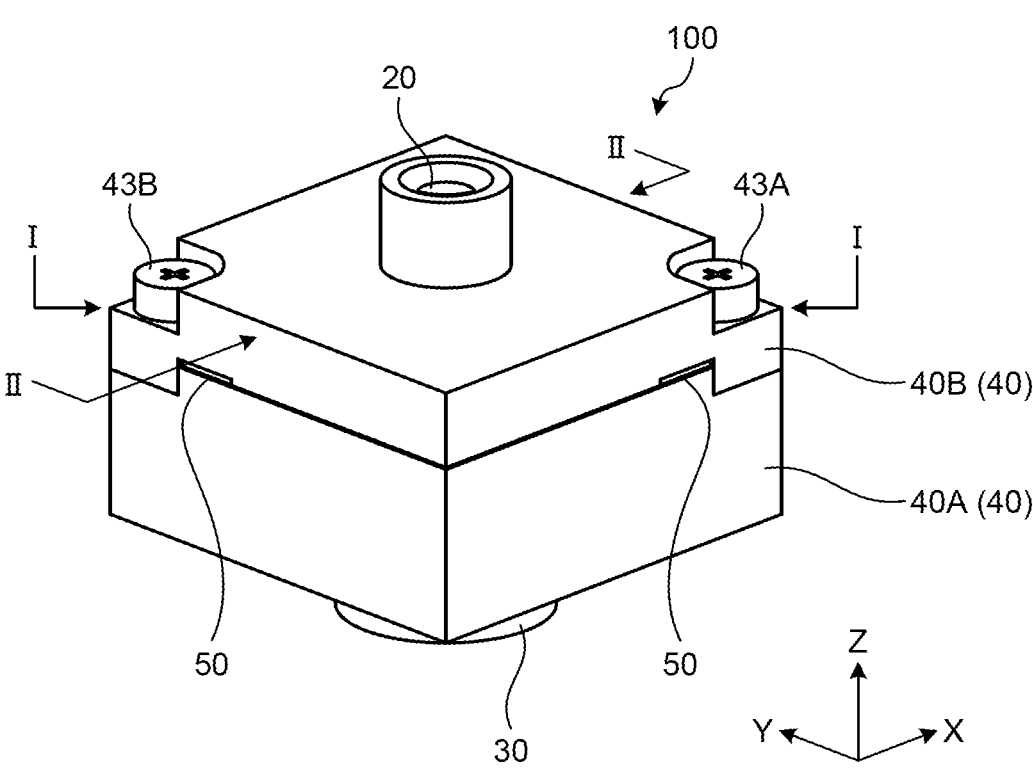
FIG. 1 is a diagram illustrating an example of a perspective view of an imaging device according to an embodiment.
Figure 2:
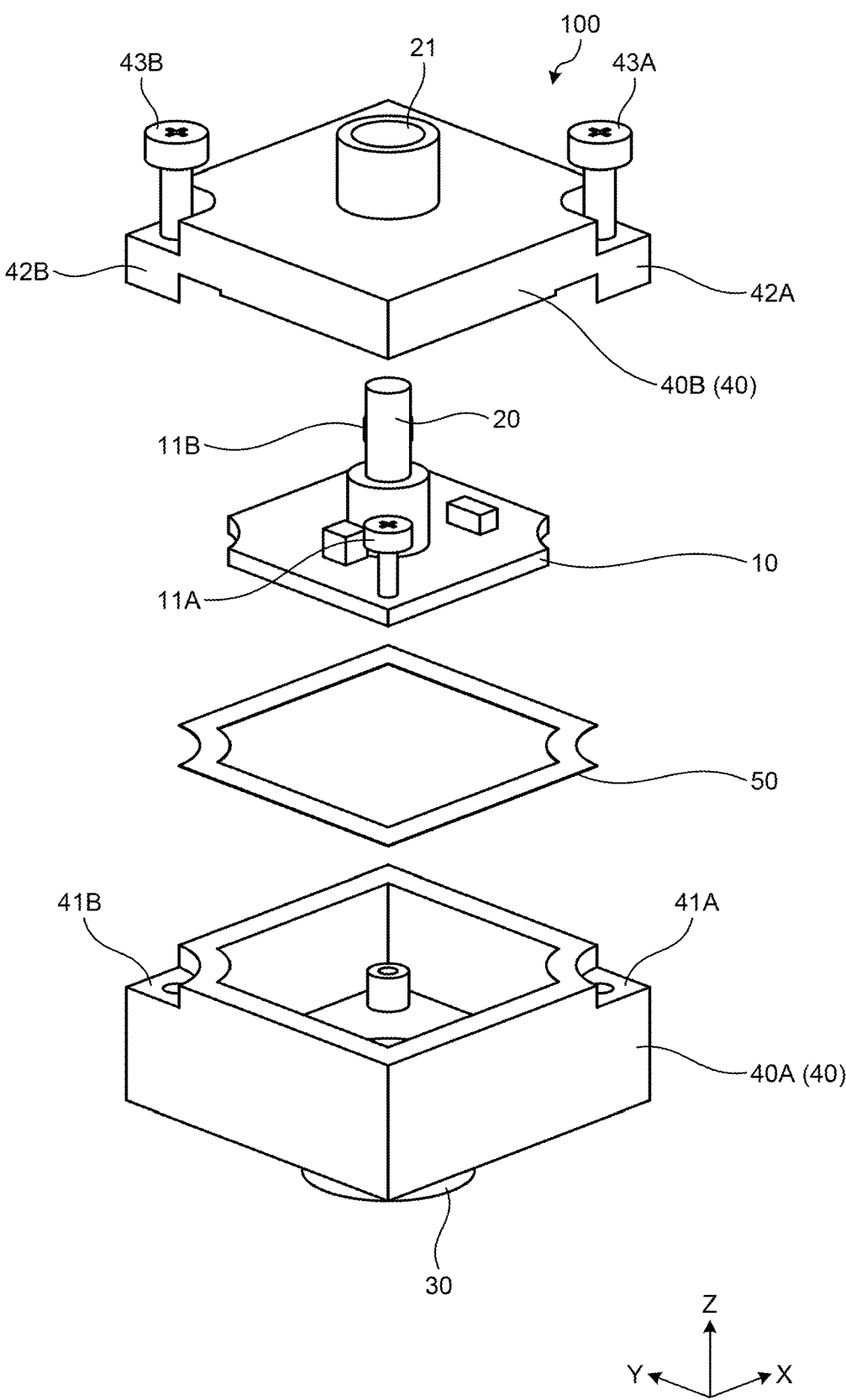
FIG. 2 is a diagram illustrating an example of a component configuration diagram of the imaging device according to the embodiment.
Figure 3:
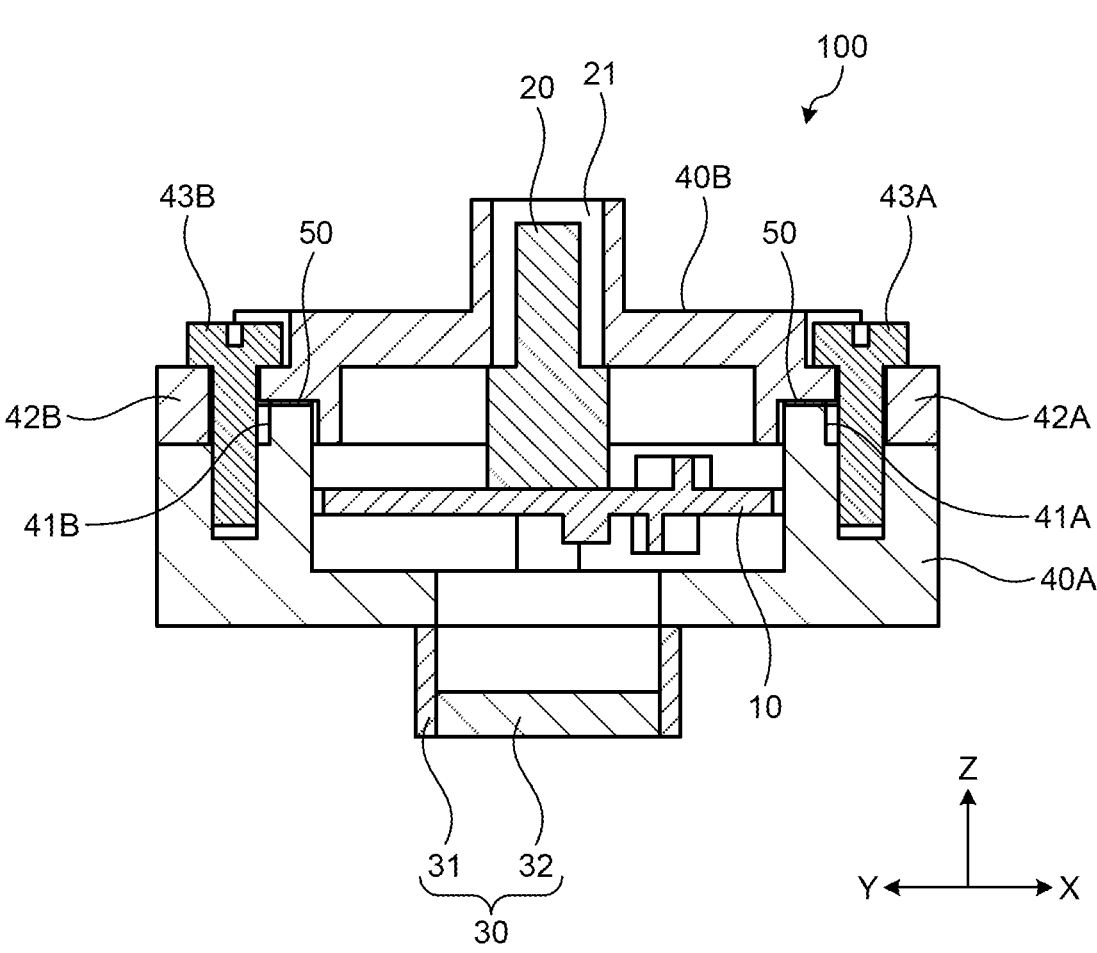
FIG. 3 is a diagram illustrating an example of a cross-sectional view of the imaging device according to the embodiment.
Figure 4:
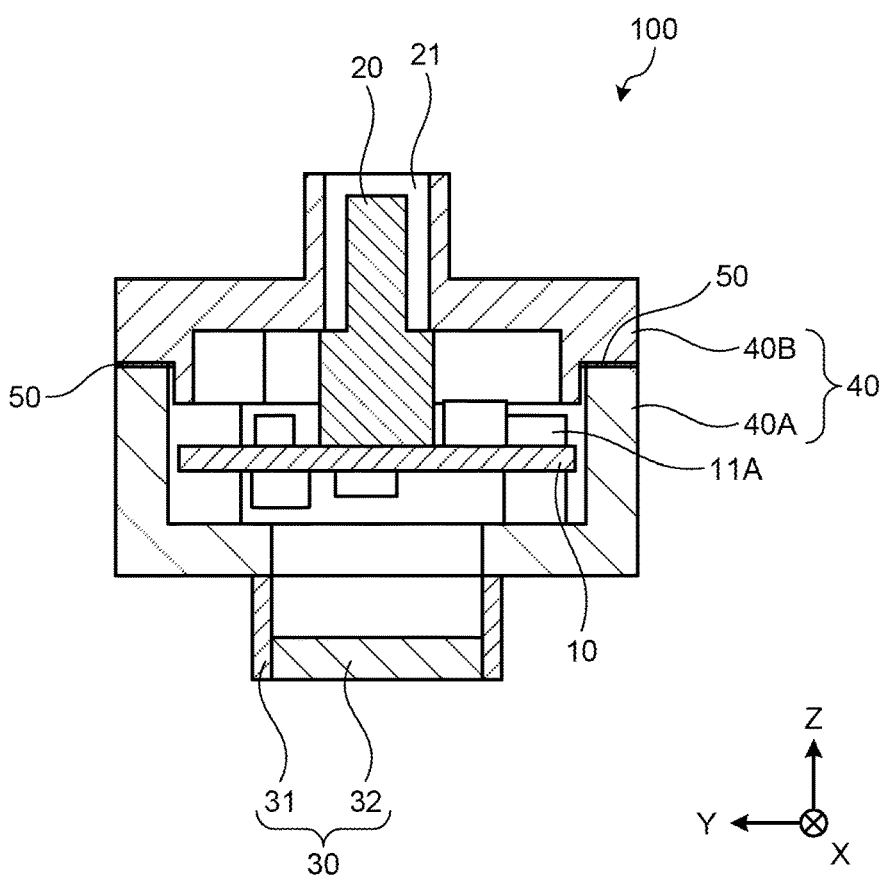
FIG. 4 is a diagram illustrating an example of a cross-sectional view of the imaging device according to the embodiment.

FIG. 1 is a perspective view of an imaging device 100 according to the embodiment. FIG. 2 is a component configuration diagram of the imaging device 100 according to the embodiment. FIG. 3 is a cross-sectional view of the imaging device 100 taken along arrows I-I illustrated in FIG. 1. FIG. 4 is a cross-sectional view of the imaging device 100 taken along arrows II-II illustrated in FIG. 1.

Note that in the drawings described below, an X axis, a Y axis, and a Z axis orthogonal to each other are illustrated for convenience, and a left-right direction (X direction), a front-back direction (Y direction), and an up-down direction (Z direction) in the imaging device 100 according to the embodiment will be described using the X axis, the Y axis, and the Z axis. Note that in the following description, when simply described as the X direction, the Y direction, and the Z direction, the X direction, the Y direction, and the Z direction are the respective axial directions and each include two opposite directions.

In addition, when the direction is specified as a positive direction of the X axis, it is one direction from the left side to the right side. When the direction is specified as a positive direction of the Y axis, it is one direction from the front side to the back side. When the direction is specified as a positive direction of the Z axis, it is one direction from the lower side to the upper side. When the direction is specified as a negative direction of the X axis, it is one direction from the right side to the left side. When the direction is specified as a negative direction of the Y axis, it is one direction from the back side to the front side. When the direction is specified as a negative direction of the Z axis, it is one direction from the upper side to the lower side.

The imaging device 100 according to the embodiment includes a substrate 10, a first fixing member 11A, a second fixing member 11B, a cable member 20, a lens unit 30, a housing 40, a third fixing member 43A, a fourth fixing member 43B, and a conductive member 50.

The substrate 10 is accommodated in the housing 40. On the substrate 10, an imaging element (not illustrated) that captures a subject image formed on an imaging surface by a lens 32 is mounted. The imaging element is, for example, a complementary metal oxide semiconductor (CMOS) image sensor. In addition, the substrate 10 generates electromagnetic noise by the operation of the imaging element. That is, the substrate 10 is a generation source that generates electromagnetic noise.

The first fixing member 11A and the second fixing member 11B fasten the substrate 10 to a first housing 40A described later in the negative direction of the Z-axis direction. The first fixing member 11A and the second fixing member 11B are, for example, fixing screws made of a conductive material such as a metal material (as an example, stainless steel). As a result, the substrate 10 is electrically connected to the ground of the first housing 40A. That is, the potential of the first housing 40A is the same as the ground potential of the substrate 10.

In the present embodiment, the first fixing member 11A and the second fixing member 11B are provided so as to face each other on an XY plane. More specifically, the first fixing member 11A and the second fixing member 11B are provided at diagonal corners of corners of the substrate 10. Note that the first fixing member 11A and the second fixing member 11B are provided such that a straight line connecting the first fixing member 11A and the second fixing member 11B and a straight line connecting the third fixing member 43A and the fourth fixing member 43B described later are substantially orthogonal to each other.

The cable member 20 connects the substrate 10 and an external device (not illustrated). The cable member 20 passes through a through hole 21 formed in a second housing 40B described later. The cable member 20 is, for example, a power cable or a signal cable.

The lens unit 30 includes a lens barrel 31 and the lens 32. The lens barrel 31 is a cylindrical member whose both ends are opened. The lens 32 is disposed at a predetermined position inside the lens barrel 31. The lens barrel 31 can be formed using, for example, a resin material, a metal material, or the like. The lens 32 is formed of plastic, glass, or the like. The lens 32 is disposed along the optical axis inside the lens barrel 31 and forms an image of light from a subject on the imaging element (not illustrated) mounted on the substrate 10. That is, the imaging element is disposed on the optical axis of the lens unit 30. Note that the number of lenses 32 may be one or plural.

The housing 40 is made of a conductive material such as metal, and accommodates the substrate 10. The housing 40 has a rectangular parallelepiped shape and includes the first housing 40A and the second housing 40B. The housing 40 is made of, for example, aluminum die cast (as an example, an aluminum alloy such as ADC 12), a magnesium alloy, or the like. Note that the shape of the housing 40 is not limited to a rectangular parallelepiped shape, and may be a substantially rectangular parallelepiped shape in which the corners of the housing are rounded or a polygonal shape, and the housing 40 may have any shape as long as it can accommodate the substrate 10.

By making the housing 40 using a conductive material, it is possible to suppress radiation (electromagnetic interference (EMI)) of electromagnetic noise generated from the substrate 10 accommodated in the housing 40 to the outside of the housing 40, suppress entry of noise from the outside to the inside of the housing 40, and improve malfunction resistance (electromagnetic susceptibility (EMS)) of the imaging device 100.

The first housing 40A and the second housing 40B accommodate the substrate 10 in a space formed by combining the first housing 40A and the second housing 40B. Specifically, the first housing 40A includes a first recess 41A and a second recess 41B (hereinafter also referred to as a recess 41). The second housing 40B includes a first projection 42A and a second projection 42B (hereinafter also referred to as a projection 42). The first housing 40A and the second housing 40B are connected by combining the recess 41 and the projection 42 via the third fixing member 43A and the fourth fixing member 43B described later.

The third fixing member 43A and the fourth fixing member 43B are fastened to the first housing 40A from the second housing 40B toward the negative direction of the Z-axis direction. The third fixing member 43A and the fourth fixing member 43B are, for example, fixing screws made of a conductive material such as a metal material (as an example, stainless steel). In addition, the third fixing member 43A and the fourth fixing member 43B are positioned so as to face each other on the XY plane.

Note that the first housing 40A and the second housing 40B according to the present embodiment are subjected to a treatment for corrosion prevention. The corrosion preventing treatment is, for example, an anodizing treatment, a nickel plating treatment, or the like. The surfaces of the first housing 40A and the second housing 40B are covered with an oxide film due to the corrosion preventing treatment. Therefore, the surfaces of the first housing 40A and the second housing 40B have non-conductivity (hereinafter also referred to as insulating layers), but the first housing 40A and the second housing 40B are electrically connected by the third fixing member 43A and the fourth fixing member 43B described above.

Next, a joint portion between the first housing 40A and the second housing 40B will be described. As described above, the surfaces of the first housing 40A and the second housing 40B are subjected to the corrosion preventing treatment. Therefore, the joint portion between the first housing 40A and the second housing 40B is not electrically connected and has non-conductivity.

Meanwhile, a minute gap is generated at the joint portion between the first housing 40A and the second housing 40B. Therefore, conventionally, in order to improve waterproof performance, a non-conductive elastic body such as a rubber packing is provided in the gap between the housings, and the housings 40 are engaged via the elastic body.

However, in the conventional configuration, the waterproof performance can be improved by the non-conductive elastic body, but electromagnetic noise leaking from the gap cannot be prevented, and there is room for further improvement.

In addition, in the above-described configuration, in the housing 40, fixed portions fixed to each other via the third fixing member 43A and the fourth fixing member 43B in the gap at the joint portion between the first housing 40A and the second housing 40B function as like feeding points of a dipole antenna. In addition, a sidewall of a gap portion extending in a direction away from the fixed portion functioning as the feeding point functions as an element of the dipole antenna that receives the electromagnetic noise. Then, when the dipole antenna receives the electromagnetic noise generated from the substrate 10 and the housing 40 itself resonates, there is a possibility that the electromagnetic noise leaks to the outside and the electromagnetic noise enters from the outside.

Therefore, the imaging device 100 of the present embodiment has the following configuration in order to suppress the leakage and entry of the electromagnetic noise described above.

The imaging device 100 of the present embodiment includes the conductive member 50. The conductive member 50 is a component that suppresses resonance between the substrate 10 and the housing 40 described later. The conductive member 50 is, for example, a ring member and has a flat rectangular annular shape. The conductive member 50 has conductivity and is formed of a resin member including an elastic body. The conductive member 50 is disposed at the joint portion between the first housing 40A and the second housing 40B.

In the above configuration, the conductive member 50 can electrically couple the first housing 40A and the second housing 40B. Specifically, the conductive member 50 functions as like a capacitor at the joint portion between the first housing 40A and the second housing 40B, and electrically couples the first housing 40A and the second housing 40B (hereinafter also referred to as capacitive coupling).

In addition, since an impedance decreases with the capacitive coupling when a frequency increases, the degree of coupling increases and a conduction state is nearly established. In general, the above-described capacitive coupling affects the performance of electromagnetic compatibility (EMC) at a high frequency (1 GHz or more), and the conduction state can be regarded as being established in this high frequency range. Therefore, although the surfaces of the first housing 40A and the second housing 40B in external appearance are non-conductive, the first housing 40A and the second housing 40B are brought into conduction via the conductive member 50 at a high frequency.

As described above, in the housing 40, the gap between the first housing 40A and the second housing 40B can be filled with the conductive member 50 interposed therebetween, and a potential difference between the first housing 40A and the second housing 40B can be eliminated. As a result, it is possible to prevent the gap between the first housing 40A and the second housing 40B from functioning as a dipole antenna. Therefore, the housing 40 can reduce leakage and entry of electromagnetic noise leaking and entering from the gap between the first housing 40A and the second housing 40B, and can reduce leakage and entry of electromagnetic noise due to resonance.

Note that the corrosion preventing treatment may be applied to any one of the first housing 40A and the second housing 40B, or may not be applied to both of the first housing 40A and the second housing 40B. In addition, the corrosion preventing treatment may not be applied to only the joint portion between the first housing 40A and the second housing 40B, or any one or both of the first housing 40A and the second housing 40B. Note that the thickness of the corrosion preventing treatment of the first housing 40A and the second housing 40B is preferably a thickness in a range in which the conductive member 50 can function as a capacitor. For example, the thickness of the corrosion preventing treatment may be several μm to several tens μm, and is not limited thereto.

In addition, since the conductive member 50 also functions as a component that suppresses entry of liquid such as water to the inside of the imaging device 100, waterproof performance can be improved. That is, the conductive member 50 can also suppress entry of liquid from between the first housing 40A and the second housing 40B.

Next, a joint configuration between the first housing 40A and the lens barrel 31 will be described. The surface of the first housing 40A is subjected to the treatment for corrosion prevention as described above. The first housing 40A may be further subjected to a coating treatment after being subjected to the corrosion preventing treatment. The coating treatment is, for example, electrodeposition coating, and the thickness of the electrodeposition coating is about several μm to several tens μm. The material of the electrodeposition coating is, for example, an epoxy resin, an acrylic resin, or the like.

The first housing 40A subjected to the corrosion preventing treatment and the coating treatment is bonded to the lens barrel 31 via an adhesive layer made of an adhesive. When the surface of the lens barrel 31 is resin, it is preferable from the viewpoint of ease of bonding that the lens barrel 31 is bonded to the first housing 40A having the surface of resin by electrodeposition coating. When the surface of the lens barrel 31 is metal, it is preferable from the viewpoint of ease of bonding that the lens barrel 31 is bonded to the first housing 40A having the surface of metal by corrosion preventing treatment. Note that a method of attaching the lens barrel 31 to the first housing 40A is not limited to the adhesive.

Figure 5:
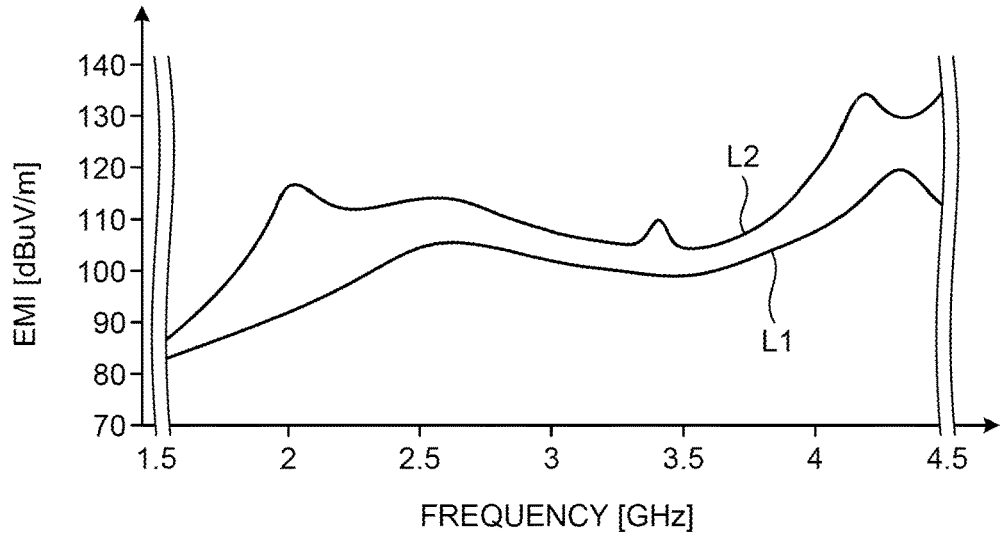
FIG. 5 is a diagram illustrating an example of frequency characteristics of EMI of the imaging device according to the embodiment.

Next, an electromagnetic noise distribution radiated from the housing 40 will be described. FIG. 5 illustrates a relationship between the frequency of electromagnetic noise radiated from the substrate 10 and the intensity of electromagnetic noise radiated from the housing 40. In FIG. 5, the vertical axis represents the electromagnetic noise (dBuV/m), and the horizontal axis represents the frequency (GHz).

In addition, in the graph illustrated in FIG. 5, L1 indicates a case where the state of the conductive member 50 provided between the first housing 40A and the second housing 40B is a conductive material, and L2 indicates a case where the conductive member 50 is non-conductive as a comparative example.

When the conductivity L1 and the non-conductivity L2 are compared, the intensity of the electromagnetic noise tends to increase as the frequency increases, but the intensity of the electromagnetic noise is higher in the non-conductivity L2 than in the conductivity L1.

In addition, in the non-conductivity L2, when the frequency is 2 (GHz) for example, the intensity of the electromagnetic noise rapidly increases. This is because resonance occurs in the housing 40 due to the electromagnetic noise generated from the substrate 10. On the other hand, in the conductivity L1, the intensity does not rapidly increase when the frequency is 2 (GHz) for example. This is because since the conductive member 50 has conductivity, it is less likely to be affected by the electromagnetic noise generated from the substrate 10, and the occurrence of resonance of the housing 40 is suppressed.

As a result, in the housing 40, by providing the conductive member 50 having conductivity at the joint portion between the first housing 40A and the second housing 40B, even in a state where the joint portion of the housing 40 has an oxide film, it is possible to eliminate the gap and the potential difference between the first housing 40A and the second housing 40B, and it can be seen that there is an effect of reducing electromagnetic noise. Therefore, the imaging device 100 can reduce electromagnetic noise leaking and entering from the housing 40.

Note that in order to reduce the electromagnetic noise, a fixing member may be further added to eliminate the minute gap at the joint portion between the first housing 40A and the second housing 40B. However, the addition of the fixing member leads to an increase in cost. In addition, since the shapes of the first housing 40A and the second housing 40B become complicated, providing the conductive member 50 having conductivity at the joint portion between the first housing 40A and the second housing 40B leads to no additional cost.

According to the present disclosure, leakage and entry of electromagnetic noise can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicular camera comprising:
a substrate on which an imaging element is mounted;
a housing, in which at least a portion of the substrate is accommodated, the housing having:
a first housing made of metal, the first housing including a first wall and a first wall end; and
a second housing made of metal, the second housing including a second wall and a second wall end, wherein the second wall end opposes the first wall end when the first housing and the second housing are combined to form the housing; and
a conductive member having conductivity and disposed between the first wall end and the second wall end, wherein,
at least one of the first wall end or the second wall end is provided with an insulating layer,
the conductive member includes a first conductive surface facing the first wall end and includes a second conductive surface facing the second wall end, and at least one of the first conductive surface or the second conductive surface is in contact with the insulating layer.

2. The vehicular camera according to claim 1, wherein the insulating layer is formed by subjecting a surface of the at least one of the first wall end or the second wall end to a corrosion preventing treatment.

3. The vehicular camera according to claim 2, wherein the corrosion preventing treatment is an anodizing treatment.

4. The vehicular camera according to claim 3, wherein a thickness of the corrosion preventing treatment is two or three μm to twenty or thirty μm.

5. The vehicular camera according to claim 1, wherein the conductive member has waterproofness.

6. The vehicular camera according to claim 1, wherein the first housing and the second housing made of metal are brought into conduction via the conductive member with respect to signal components having a frequency of 1 GHz or higher.

7. The vehicular camera according to claim 1, wherein the insulating layer is provided on a surface of the first housing, and
a surface of the insulating layer of the first housing is subjected to electrodeposition coating with resin.

8. The vehicular camera according to claim 7, wherein a thickness of the electrodeposition coating is two or three μm to twenty or thirty μm.

9. The vehicular camera according to claim 1, wherein the insulating layer includes a first insulating layer and a second insulating layer,
the first insulating layer is provided on a surface of the first wall end,
the first conductive surface is in contact with the first insulating layer,
the second insulating layer is provided on a surface of the second wall end, and
the second conductive surface is in contact with the second insulating layer.

10. The vehicular camera according to claim 1, further comprising:
a lens barrel; and
a cable, which is disposed in the second housing, electrically connected to the substrate, and passing through a hole formed in the second housing, wherein
the first housing includes an attachment portion, which is attached to the lens barrel and from which the first wall extends, and
the conductive member has a ring shape.

\* \* \* \* \*